US012580758B2

(12) United States Patent
Chiang

(10) Patent No.: US 12,580,758 B2
(45) Date of Patent: Mar. 17, 2026

(54) PROGRAMMABLE SECURE MANAGEMENT DEVICE AND CONTROL METHOD FOR PERFORMING KEY FORWARDING BETWEEN SECURE DEVICES

(71) Applicant: Realtek Semiconductor Corp., HsinChu (TW)

(72) Inventor: Ya-Han Chiang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 183 days.

(21) Appl. No.: 18/367,989

(22) Filed: Sep. 13, 2023

(65) Prior Publication Data

US 2024/0097896 A1     Mar. 21, 2024

(30) Foreign Application Priority Data

Sep. 16, 2022    (TW) .................................. 111135036

(51) Int. Cl.
*H04L 9/08* (2006.01)

(52) U.S. Cl.
CPC .................................... *H04L 9/088* (2013.01)

(58) Field of Classification Search
CPC .............................. H04L 9/088; H04L 9/0894
See application file for complete search history.

(56) References Cited

U.S. PATENT DOCUMENTS 11,502,827 B1 * 11/2022 Miller ................... H04L 9/3242
2007/0204158 A1 * 8/2007 Hatashita .............. H04W 12/03
                                                          370/352

FOREIGN PATENT DOCUMENTS

| TW | I676945 | B | 11/2019 |
|----|---------|---|---------|
| TW | 202040568 | A | 11/2020 |
| TW | 202111581 | A | 3/2021 |
| TW | 202111584 | A | 3/2021 |

OTHER PUBLICATIONS

ARM, "Arm® Platform Security Architecture Security Model 1.0", Feb. 21, 2019, USA.
ARM, "Arm® Platform Security Architecture Trusted Base System Architecture for Arm®v6-M, Arm®v7-M and Arm®v8-M 1.0", Feb. 20, 2019, USA.

* cited by examiner

*Primary Examiner* — Vu V Tran
(74) *Attorney, Agent, or Firm* — Winston Hsu

(57) ABSTRACT

A programmable secure management device and a control method for performing key forwarding between secure devices are provided. The programmable secure management device includes a key generating device, a key accepting device and a forwarding controller circuit, wherein the forwarding controller circuit is electrically coupled to the key generating device and the key accepting device. The key generating device is configured to output a source key, and the key accepting device is configured to accept a destination key, wherein the forwarding controller circuit is configured to receive a forwarding command from a host device outside the programmable secure management device, to allow the host device to request the forwarding controller circuit via the forwarding command for taking the source key as the destination key to be loaded in the key accepting device.

16 Claims, 3 Drawing Sheets

PROGRAMMABLE SECURE MANAGEMENT DEVICE AND CONTROL METHOD FOR PERFORMING KEY FORWARDING BETWEEN SECURE DEVICES

BACKGROUND OF THE INVENTION

1. Field of the Invention

The present invention is related to key management of electronic devices, and more particularly, to a programmable secure management device and a control method for performing key forwarding between secure devices.

2. Description of the Prior Art

Secure functions in an electronic device, such as secure boot, may involve access and management of keys. If execution of these functions needs to transmit a certain key from a first secure device to a second secure device, a central processing unit (CPU) typically reads this key out from the first secure device and temporarily stores this key in a storage space of the CPU, and then transmits this key to the second secure device from the CPU. As the above key transmitting process is directly controlled by software running on the CPU, this key may be exposed in the software layer, making it at risk of being tampered with or stolen.

Thus, there is a need for a novel architecture and an associated control method wherein, during the key transmitting process, CPU intervention and the software running thereon are reduced as much as possible, thereby improving security of an overall system.

SUMMARY OF THE INVENTION

An objective of the present invention is to provide a programmable secure management device and a control method for performing key forwarding between secure devices, in order to lower the risk of a key being tampered with or stolen during a transmitting process without introducing any side effect or in a way that is less likely to introduce side effects.

At least one embodiment of the present invention provides a programmable secure management device. The programmable secure management device comprises a key generating device, a key accepting device and a forwarding controller circuit, wherein the forwarding controller circuit is electrically coupled to the key generating device and the key accepting device. The key generating device may output a source key, and the key accepting device may accept a destination key, wherein the forwarding controller circuit may receive a forwarding command from a host device outside the programmable secure management device, to allow the host device to request the forwarding controller circuit via the forwarding command for taking the source key as the destination key to be loaded in the key accepting device.

At least one embodiment of the present invention provides a control method for performing key forwarding between secure devices, wherein the control method is applicable to a programmable secure management device. The control method comprises: utilizing a forwarding controller circuit of the programmable secure management device to receive a forwarding command from a host device outside the programmable secure management device, wherein the host device requests the forwarding controller circuit via the forwarding command for taking a source key of a key generating device of the programmable secure management device as a destination key to be loaded in a key accepting device of the programmable secure management device.

The programmable secure management device and the control method provided by the embodiments of the present invention can perform the key forwarding between secure devices with the aid of operations of the forwarding controller circuit under a condition where the host device does not need to directly access the key. The embodiments of the present invention will not greatly increase additional costs. Thus, the present invention can improve the security of the overall system without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
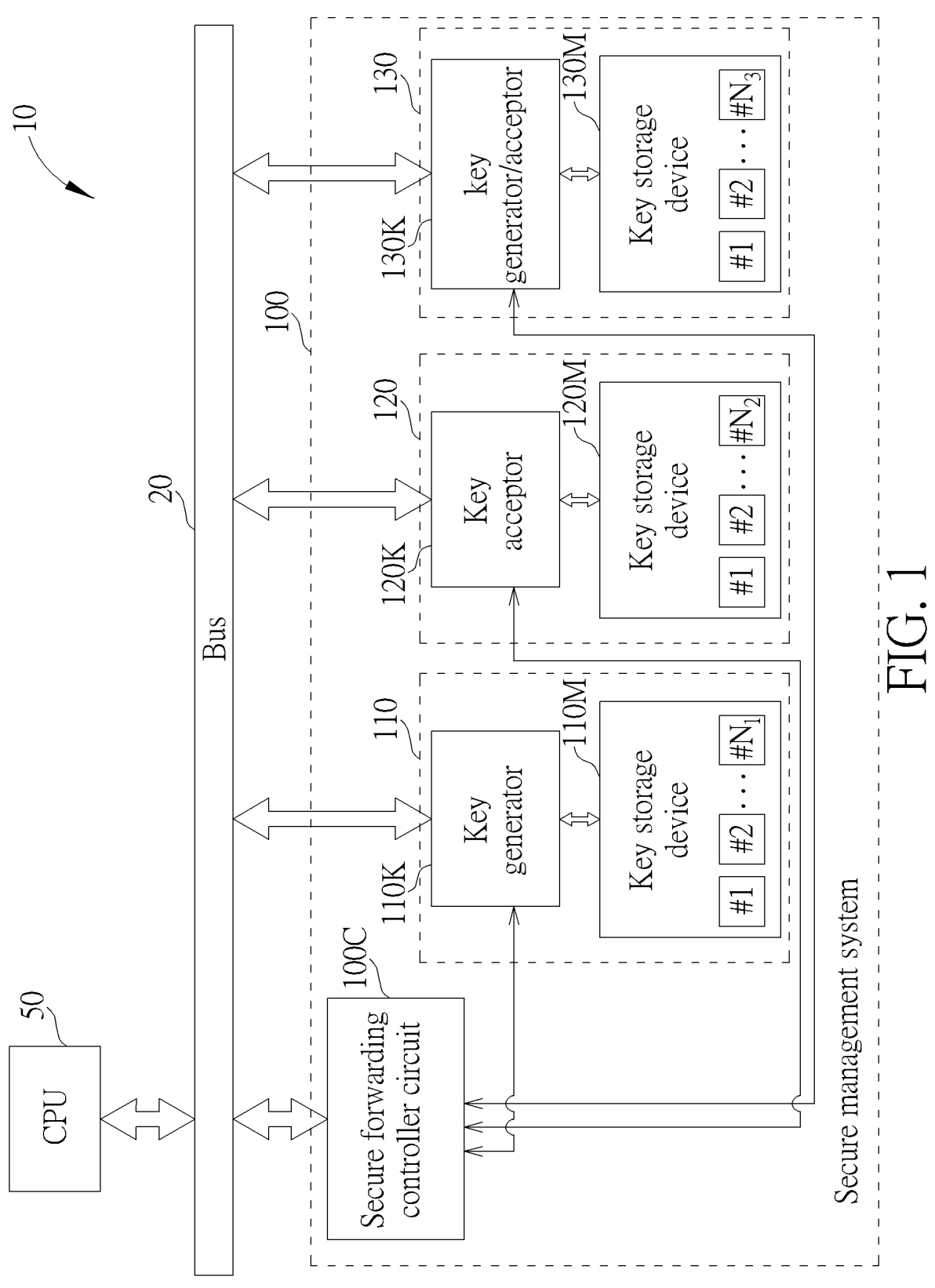
FIG. 1 is a diagram illustrating an electronic device according to an embodiment of the present invention.

FIG. 1 is a diagram illustrating an electronic device 10 according to an embodiment of the present invention. The electronic device 10 may comprise a host device such as a central processing unit (CPU) 50, a bus 20 and a programmable secure management device such as a programmable secure management system 100, where the bus 20 is electrically coupled to the CPU 50 and the programmable secure management system 100. In this embodiment, the programmable secure management system 100 may comprise a forwarding controller circuit such as a secure forwarding controller circuit 100C, and multiple secure devices such as a key generating device 110, a key accepting device 120 and a key generating with accepting device (referred to as "key generating/accepting device" for brevity) 130. The key generating device 110 may comprise a key generator 110K and a key storage device 110M, where the key generator 110K may be configured to generate key data and store the key data into the key storage device 110M, or the key generator 110K may output key data within the key storage device 110M as a source key to outside of the key generating device 110 (e.g. output to the secure forwarding controller circuit 100C or the CPU 50) according to access arbitration and control access signals of the key generating device 110. For example, the secure forwarding controller circuit 100C may perform a one-way-read operation upon the key generating device 110. The key accepting device 120 may comprise a key acceptor 120K and a key storage device 120M, where the key acceptor 120K may accept a destination key from outside the key accepting device 120 (e.g. from the secure forwarding controller circuit 100C or the CPU 50), and store the destination key into the key storage device 120M as key data according to access arbitration and control access signals to the key accepting device 120. For example, the secure forwarding controller circuit 100C may perform a one-way-write operation upon the key accepting device 120. The key generating/accepting device 130 may comprise a key generator with acceptor (referred to as "key generator/acceptor" for brevity) 130K and a key storage device 130M, where the key generator/acceptor 130K may have the functions of both the key generator 110K and the key acceptor 120K, and operations of the key storage device 130M are similar to the key storage devices 110M and 120M. For example, the secure forwarding controller circuit 100C may perform a bidirectional-read-write operation upon the key generating/accepting device 130. For brevity, related details of the key generating/accepting device 130 are not repeated here.

It should be noted that the key storage device 110M may comprise $N_1$ source key ports, where $N_1$ is a positive integer, and the $N_1$ source key ports may correspond to different key registers within the key generating device 110, respectively (e.g. configuring these key registers as the $N_1$ source key ports). For example, the key storage device 110M may comprise $N_1$ key registers (which are represented by blocks labeled "#1", "#2", . . . , and "#$N_1$" within the key storage device 110M in figures) for storing $N_1$ sets of different key data (e.g. $N_1$ sets of different key metadata) generated by the key generator 110K. The key storage device 120M may comprise $N_2$ destination key ports, where $N_2$ is a positive integer, and the $N_2$ destination key ports may correspond to different key registers within the key accepting device 120, respectively (e.g. configuring these key registers as the $N_2$ destination key ports). For example, the key storage device 120M may comprise $N_2$ key registers (which are represented by blocks labeled "#1", "#2", . . . , and "#$N_2$" within the key storage device 120M in figures) for storing $N_2$ sets of different key data (e.g. $N_2$ sets of different key metadata) accepted by the key acceptor 120K. The key storage device 130M may comprise $N_3$ key ports, where $N_3$ is a positive integer, each of the $N_3$ key ports may serve as a source key port or a destination key port, and the $N_3$ key ports may correspond to different key registers within the key generating/accepting device 130, respectively (e.g. configuring these key registers as the $N_3$ key ports). For example, the key storage device 130M may comprise $N_3$ key registers (which are represented by blocks labeled "#1", "#2", . . . , and "#$N_3$" within the key storage device 130M in figures) for storing $N_3$ sets of different key data (e.g. $N_3$ sets of different key metadata) generated or accepted by the key generator/acceptor 130K.

Figure 2:
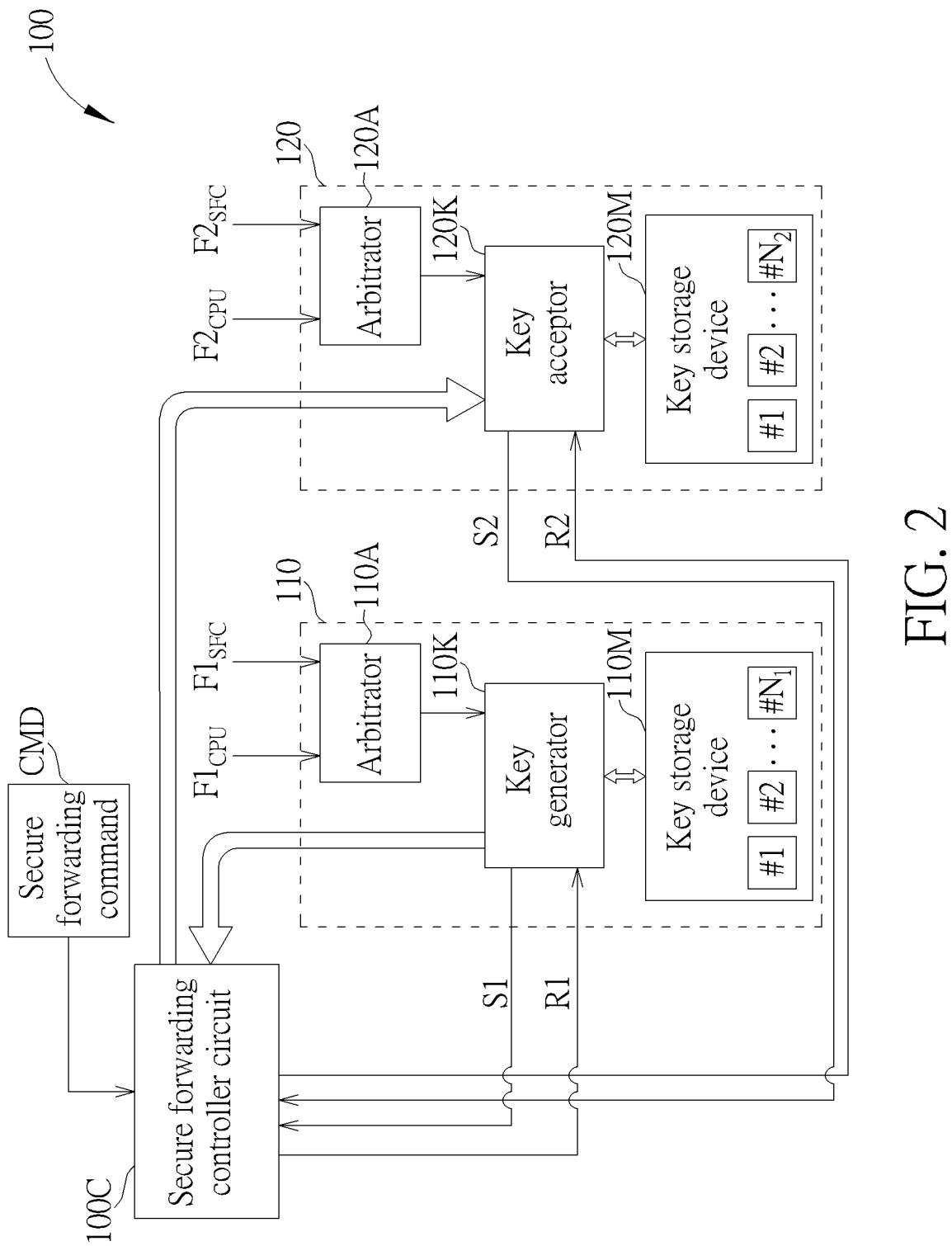
FIG. 2 is a diagram illustrating a programmable secure management device according to an embodiment of the present invention.

FIG. 2 is a diagram illustrating detailed operations of the programmable secure management system 100 according to an embodiment of the present invention. In this embodiment, the secure forwarding controller circuit 100C may be configured to receive a forwarding command such as a secure forwarding command CMD from a host device which is positioned outside of the programmable secure management system 100, such as the CPU 50, to allow the CPU 50 to request the secure forwarding controller circuit 100C via the secure forwarding command CMD for taking the source key output from the key generating device 110 as the destination key to be loaded in the key accepting device 120. In addition, the programmable secure management system 100 may comprise multiple candidate key generating devices and multiple candidate key accepting devices, where any (e.g. each) of the multiple candidate key generating devices may comprise multiple source key ports, and any (e.g. each) of the multiple candidate key accepting devices may comprise multiple destination key ports. In order to perform key forwarding between a specific source key port of a specific candidate key generating device and a specific destination key port of a specific candidate key accepting device, the secure forwarding command CMD may comprise multiple fields such as {Source_Engine, Source_Port_Index, Destination_Engine, Destination_Port_Index, Data_Length}, where the field Source_Engine may indicate a specific key generating device (e.g. the key generating device 110) among the multiple candidate key generating devices, the field Source_Port_Index may indicate a specific source key port among multiple source key ports of the specific key generating device (e.g. one of the $N_1$ key registers within the key storage device 110M), the field Destination_Engine may indicate a specific key accepting device (e.g. the key accepting device 120) among the multiple candidate key accepting devices, the field Destination_Port_Index may indicate a specific destination key port among multiple destination key ports of the specific key accepting device (e.g. one of the $N_2$ key registers within the key storage device 120M), and the field Data_Length may indicate a data length of a transmitted key.

For example, the CPU 50 may control a value of the field Source_Engine to request the secure forwarding controller circuit 100C for selecting the specific key generating device (e.g. the key generating device 110) from the multiple candidate key generating devices, and more particularly, the CPU 50 may control a value of the field Source_Port_Index to request the secure forwarding controller circuit 100C for obtaining the source key from the specific source key port (e.g. one of the $N_1$ key registers within the key storage device 110M) of the specific key generating device. In addition, the CPU 50 may control a value of the field Destination_Engine to request the secure forwarding controller circuit 100C for selecting the specific key accepting device (e.g. the key accepting device 120) from the multiple candidate key accepting devices, and more particularly, the CPU 50 may control a value of the field Destination_Port_Index to request the secure forwarding controller circuit 100C for taking the source key as the destination key to be loaded in the specific destination key port (e.g. one of the $N_2$ key registers within the key storage device 120M) of the specific key accepting device.

After the secure forwarding controller circuit 100C receives the secure forwarding command CMD, the secure forwarding controller circuit 100C may send a transmitting request R1 to the key generating device 110 according to the secure forwarding command CMD, to check whether the specific source key port is busy or not, and the key generating device 110 may respond with a state S1 to the secure forwarding controller circuit 100C in response to the transmitting request R1. When the state S1 of the key generating device 110 indicates that the specific source key port is not busy, the secure forwarding controller circuit 100C may obtain the source key from the specific source key port. In addition, the secure forwarding controller circuit 100C may send a loading request R2 to the key accepting device 120 according to the secure forwarding command CMD, to check whether the specific destination key port is busy or not, and the key accepting device 120 may respond with a state S2 to the secure forwarding controller circuit 100C in response to the loading request R2. When the state S2 of the key accepting device 120 indicates that the specific destination key port is not busy, the secure forwarding controller circuit 100C may take the source key as the destination key to be loaded in the specific destination key port. In addition, the secure forwarding controller circuit 100C may perform error handling upon the key generating device 110 and the key accepting device 120 according to the states S1 and S2, respectively; for example, performing error handling upon key storage status, operation timeout, forwarding status, etc.

In this embodiment, the key generating device 110 may output the source key according to a transmitting request, where the key generating device 110 may further comprise a source arbitrator 110A (labeled "Arbitrator" in FIG. 2 for brevity) configured to determine whether this transmitting request is from the secure forwarding controller circuit 100C or not according to one or more flag signals such as $F1_{CPU}$ and $F1_{SFC}$. For example, when the secure forwarding controller circuit 100C sends the transmitting request R1 to the key generating device 110, the flag signal $F1_{CPU}$ may be set to be "0" and the flag signal $F1_{SFC}$ may be set to be "1" for indicating that the transmitting request R1 is from the secure forwarding controller circuit 100C, and the source arbitrator 110A may control the key generating device 110 (e.g. the key generator 110K therein) to encrypt key data of the specific source key port for generating the source key to be output (i.e. the source key output from the key generating device 110 is encrypted key data). In another example, when the CPU 50 sends a transmitting request to the key generating device 110, the flag signal $F1_{CPU}$ may be set to be "1" and the flag signal $F1_{SFC}$ may be set to be "0" for indicating that this transmitting request is from the CPU 50, and the source arbitrator 110A may control the key generating device 110 (e.g. the key generator 110K therein) to take key data of the specific source key port as the source key to be output (i.e. the source key output from the key generating device 110 is key data without encryption).

In addition, the key accepting device 120 may receive the destination key according to a loading request, where the key accepting device 120 may further comprise a destination arbitrator 120A (labeled "Arbitrator" in FIG. 2 for brevity) configured to determine whether this loading request is from the secure forwarding controller circuit 100C according to one or more flag signals such as $F2_{CPU}$ and $F2_{SFC}$. For example, when the secure forwarding controller circuit 100C sends the loading request R2 to the key accepting device 120, the flag signal $F2_{CPU}$ may be set to be "0" and the flag signal $F2_{SFC}$ may be set to be "1" for indicating that the loading request R2 is from the secure forwarding controller circuit 100C, and the destination arbitrator 120A may control the key accepting device 120 (e.g. the key acceptor 120K therein) to decrypt the destination key for obtaining the key data. In another example, when the CPU 50 sends a loading request to the key accepting device 120, the flag signal $F2_{CPU}$ may be set to be "1" and the flag signal $F2_{SFC}$ may be set to be "0" for indicating that this loading request is from the CPU 50, and the destination arbitrator 120A may control the key accepting device 120 (e.g. the key acceptor 120K therein) to load the destination key into the specific destination key port without decrypting the destination key.

It should be noted that, although the flag signals $F1_{CPU}$ and $F1_{SFC}$ received by the source arbitrator 110A are represented by symbols different from the flag signals $F1_{CPU}$ and $F1_{SFC}$ received by the destination arbitrator 120A, the present invention is not limited thereto. For example, the flag signal $F1_{CPU}$ received by the source arbitrator 110A and the flag signal $F2_{CPU}$ received by the destination arbitrator 120A may be the same, and the flag signal $F1_{SFC}$ received by the source arbitrator 110A and the flag signal $F2_{SFC}$ received by the destination arbitrator 120A may be the same.

In addition to the above encryption enablement control, the source arbitrator 110A and the destination arbitrator 120A may control whether to enable some functions such as a forwarding bytes-aligned operation (e.g. big-endian/little-endian based bytes-aligned operations). For example, when the source arbitrator 110A and/or the destination arbitrator 120A determine that a certain transmitting request and/or a certain loading request are from the secure forwarding controller circuit 100C (e.g. when the flag signals $F1_{CPU}$ and $F1_{SFC}$ indicates that this transmitting request is from the secure forwarding controller circuit 100C or when the flag signals $F2_{CPU}$ and $F2_{SFC}$ indicates that this loading request is from the secure forwarding controller circuit 100C), the forwarding bytes-aligned operation may be enabled. The source arbitrator 110A may control the key generating device 110 (e.g. the key generator 110K therein) to perform byte alignment upon key data (e.g. key data of the specific source key port) with a specific byte number (e.g. 4 bytes, 16 bytes, 32 bytes), in order to generate aligned key data, and control a forwarding order according to the aligned key data. When the source arbitrator 110A and/or the destination arbitrator 120A determines that a certain transmitting request and/or a certain loading request are from the CPU 50, the forwarding bytes-aligned operation may be disabled. In addition, the secure forwarding controller circuit 100C may transmit a notification message to the CPU 50 in response to an operation processing state or an error state corresponding to the secure forwarding command CMD, to allow the CPU 50 to perform error handling (e.g. performing the error handling in a software manner).

In addition, an internal storage space of the secure forwarding controller circuit 100C may store a blacklist, where the blacklist may record some prohibited transactions. For example, when the blacklist indicates that the source key of the key generating device 110 is unable to be transmitted to the key accepting device 120, the secure forwarding controller circuit 100C may discard the secure forwarding command CMD to prevent the source key from being taken as the destination to be loaded in the key accepting device 120.

It should be noted that the embodiment of FIG. 2 illustrates key forwarding between the key generating device 110 and the key accepting device 120, and operations related to the key generating/accepting device 130 may be deduced by analogy.

Figure 3:
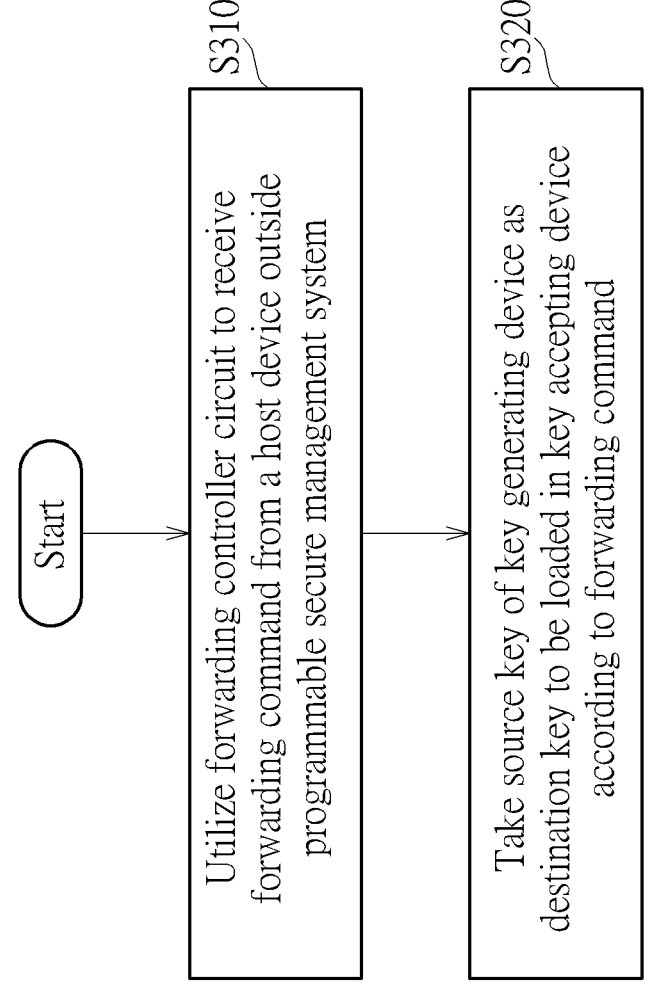
FIG. 3 is a diagram illustrating a working flow of a method for performing key forwarding between secure devices according to an embodiment of the present invention.

FIG. 3 is a diagram illustrating a working flow of a method for performing key forwarding between secure devices according to an embodiment of the present invention, where the control method is applicable to the programmable secure management system 100. It should be noted that the working flow shown in FIG. 3 is for illustrative purposes only, and is not meant to be a limitation of the present invention. For example, one or more steps may be added, deleted or modified in the working flow shown in FIG. 3. In addition, as long as an overall result is not hindered, these steps do not have to be executed in the exact order shown in FIG. 3.

In Step S310, the programmable secure management system 100 may utilize a forwarding controller circuit therein (e.g. the secure forwarding controller circuit 100C) to receive a forwarding command (e.g. the secure forwarding command CMD) from a host device (e.g. the CPU 50) outside the programmable secure management system 100.

In Step S320, the programmable secure management system 100 may take a source key of a key generating device therein (e.g. the key generating device 110) as a destination key to be loaded in a key accepting device (e.g. the key accepting device 120) according to the forwarding command.

To summarize, when the CPU 50 intends to execute some secure functions and these secure functions involves key forwarding between secure devices (e.g. the key generate device 110 and the key accepting device 120), the CPU 50 can transmit the transmitting request to the secure forwarding controller circuit 100C only, in order to perform the key forwarding with the aid of the secure forwarding controller circuit 100C, rather than directly accessing respective secure devices (e.g. the key generate device 110 and the key accepting device 120 mentioned above). Thus, the risk of tampering with or stealing key metadata in a software manner executed by an external device can be greatly lowered. Furthermore, when any of the secure devices mentioned above receives a transmitting/loading request from the secure forwarding controller circuit 100C, some functions such as encryption/decryption can be enabled accordingly in order to further improve the security of a transmitting process of the key metadata. In addition, the embodiments of the present invention will not greatly increase additional costs. Thus, the present invention can improve the security of the overall system without introducing any side effect or in way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A programmable secure management device that receives commands from a host device, comprising:
   a key generating circuit, configured to output a source key;
   a key accepting circuit, configured to accept a destination key; and
   a forwarding controller circuit, electrically coupled to the key generating circuit and the key accepting circuit, configured to receive a forwarding command from the host device, to enable the host device for the request of taking the source key as the destination key to be loaded in the key accepting circuit according to the forwarding command;
   wherein the key generating circuit outputs the source key according to a transmitting request, and the key generating circuit comprises:
      a source arbitrator, configured to determine whether the transmitting request is from the forwarding controller circuit or not according to one or more flag signals;
      wherein when the one or more flag signals indicate that the transmitting request is from the forwarding controller circuit, the source arbitrator controls the key generating circuit to encrypt key data for generating the source key to be output.

2. The programmable secure management device of claim 1, wherein the forwarding controller circuit stores a blacklist, and when the blacklist indicates that the source key of the key generating circuit is unable to be transmitted to the key accepting circuit, the forwarding controller circuit discards the forwarding command to prevent the source key from being taken as the destination key to be loaded in the key accepting circuit.

3. The programmable secure management device of claim 1, wherein the programmable secure management device comprises multiple candidate key generating circuits, the key generating circuit is one of the multiple candidate key generating circuits, the forwarding command comprises at least one source information field for indicating the key generating circuit to allow the host device to request the forwarding controller circuit for selecting the key generating circuit from the multiple candidate key generating circuits to output the source key, the programmable secure management device further comprises multiple candidate key accepting circuits, the key accepting circuit is one of the multiple candidate key accepting circuits, and the forwarding command comprises at least one destination information field for indicating the key accepting circuit to allow the host device to request the forwarding controller circuit for selecting the key accepting circuit from the multiple candidate key accepting circuits to accept the destination key.

4. The programmable secure management device of claim 1, wherein the forwarding command comprises at least one source information field, the at least one source information field indicates a specific source key port among multiple source key ports of the key generating circuit, to allow the host device to request the forwarding controller circuit for obtaining the source key from the specific source key port, and the multiple source key ports correspond to different key registers within the key generating circuit, respectively, wherein the forwarding controller circuit sends a transmitting request to the key generating circuit to check whether the specific source key port is busy or not, and when a state responded by the key generating circuit indicates that the specific source key port is not busy, the forwarding controller circuit obtains the source key from the specific source key port.

5. The programmable secure management device of claim 1, wherein the forwarding command comprises at least one destination information field and the at least one destination information field indicates a specific destination key port among multiple destination key ports of the key accepting circuit, to allow the host device to request the forwarding controller circuit for taking the source key as the destination key to be loaded in the specific destination key port, and the multiple destination key ports correspond to different key registers within the key accepting circuit, respectively, wherein the forwarding controller circuit sends a loading request to the key accepting circuit to check whether the specific destination key port is busy or not, and when a state of the key accepting circuit indicates that the specific destination key port is not busy, the forwarding controller circuit takes the source key as the destination key to be loaded in the specific destination key port.

6. The programmable secure management device of claim 1, wherein the key accepting circuit accepts the destination key according to a loading request, and the key accepting circuit comprises:
   a destination arbitrator, configured to determine whether the loading request is from the forwarding controller circuit or not according to one or more flag signals;
   wherein when the one or more flag signals indicate that the loading request is from the forwarding controller circuit, the destination arbitrator controls the key accepting circuit to decrypt the destination key for obtaining the key data.

7. The programmable secure management device of claim 1, wherein the key generating circuit outputs the source key according to a transmitting request, and the key generating circuit comprises:
   a source arbitrator, configured to determine whether the transmitting request is from the forwarding controller circuit or not according to one or more flag signals;
   wherein when the one or more flag signals indicate that the transmitting request is from the forwarding controller circuit, the source arbitrator controls the key generating circuit to perform byte alignment upon key data with a specific byte number to generate aligned key data, and controls a forwarding order according to the aligned key data.

8. The programmable secure management device of claim 1, wherein the forwarding controller circuit transmits a notification message to the host device in response to an operation processing state or an error state corresponding to the forwarding command, to allow the host device to perform error handling.

9. A control method for performing key forwarding between secure devices, applicable to a programmable secure management device, the control method comprising:

utilizing a forwarding controller circuit of the programmable secure management device to receive a forwarding command from a host device outside the programmable secure management device;

wherein the host device requests the forwarding controller circuit via the forwarding command for taking a source key of a key generating device of the programmable secure management device as a destination key to be loaded in a key accepting device of the programmable secure management device;

wherein the key generating device outputs the source key according to a transmitting request, and the control method further comprises:

utilizing a source arbitrator of the key generating device to determine whether the transmitting request is from the forwarding controller circuit or not according to one or more flag signals; and in response to the one or more flag signals indicating that the transmitting request is from the forwarding controller circuit, utilizing the source arbitrator to control the key generating device to encrypt key data for generating the source key to be output.

10. The control method of claim 9, wherein the forwarding controller circuit stores a blacklist, and the control method further comprises:

in response to the blacklist indicating that the source key of the key generating device is unable to be transmitted to the key accepting device, utilizing the forwarding controller circuit to discard the forwarding command to prevent the source key from being taken as the destination key to be loaded in the key accepting device.

11. The control method of claim 9, wherein the programmable secure management device comprises multiple candidate key generating devices, the key generating device is one of the multiple candidate key generating devices, the forwarding command comprises at least one source information field for indicating the key generating device to allow the host device to request the forwarding controller circuit for selecting the key generating device from the multiple candidate key generating devices to output the source key, the programmable secure management device further comprises multiple candidate key accepting devices, the key accepting device is one of the multiple candidate key accepting devices, and the forwarding command comprises at least one destination information field for indicating the key accepting device to allow the host device to request the forwarding controller circuit for selecting the key accepting device from the multiple candidate key accepting devices to accept the destination key.

12. The control method of claim 9, wherein the forwarding command comprises at least one source information field and the at least one source information field indicates a specific source key port among multiple source key ports of the key generating device, to allow the host device to request the forwarding controller circuit for obtaining the source key from the specific source key port, and the multiple source key ports correspond to different key registers within the key generating device, respectively, wherein the control method further comprises:

utilizing the forwarding controller circuit to send a transmitting request to the key generating device to check whether the specific source key port is busy or not; and in response to a state of the key generating device indicating that the specific source key port is not busy, utilizing the forwarding controller circuit to obtain the source key from the specific source key port.

13. The control method of claim 9, wherein the forwarding command comprises at least one destination information field, the at least one destination information field indicates a specific destination key port among multiple destination key ports of the key accepting device, to allow the host device to request the forwarding controller circuit for taking the source key as the destination key to be loaded in the specific destination key port, and the multiple destination key ports correspond to different key registers within the key accepting device, respectively, wherein the control method further comprises:

utilizing the forwarding controller circuit to send a loading request to the key accepting device to check whether the specific destination key port is busy or not; and in response to a state of the key accepting device indicating that the specific destination key port is not busy, utilizing the forwarding controller circuit to take the source key as the destination key to be loaded in the specific destination key port.

14. The control method of claim 9, wherein the key accepting device accepts the destination key according to a loading request, and the control method further comprises:

utilizing a destination arbitrator of the key accepting device to determine whether the loading request is from the forwarding controller circuit or not according to one or more flag signals; and in response to the one or more flag signals indicating that the loading request is from the forwarding controller circuit, utilizing the destination arbitrator to control the key accepting device to decrypt the destination key for obtaining the key data.

15. The control method of claim 9, wherein the key generating device outputs the source key according to a transmitting request, and the control method further comprises:

utilizing a source arbitrator of the key generating device to determine whether the transmitting request is from the forwarding controller circuit or not according to one or more flag signals; and in response to the one or more flag signals indicating that the transmitting request is from the forwarding controller circuit, utilizing the source arbitrator to control the key generating device to perform byte alignment upon key data with a specific byte number to generate aligned key data, and control a forwarding order according to the aligned key data.

16. The control method of claim 9, further comprising:

utilizing the forwarding controller circuit to transmit a notification message to the host device in response to an operation processing state or an error state corresponding to the forwarding command, to allow the host device to perform error handling.

* * * * *